United States Patent [19]

Udren

[11] 4,402,028
[45] Aug. 30, 1983

[54] PROTECTIVE RELAY METHODS AND APPARATUS

[75] Inventor: Eric A. Udren, Monroeville, Pa.
[73] Assignee: Electric Power Research Institute, Inc., Palo Alto, Calif.
[21] Appl. No.: 293,531
[22] Filed: Aug. 17, 1981
[51] Int. Cl.³ .......................................... H02H 7/045
[52] U.S. Cl. ..................................... 361/36; 361/78; 361/86; 361/87
[58] Field of Search ....................... 361/36, 35, 87, 78, 361/85, 86, 113

[56] References Cited

U.S. PATENT DOCUMENTS

| | | | |
|---|---|---|---|
| 3,337,772 | 8/1967 | Andersson | 361/36 |
| 3,414,772 | 12/1968 | Sonnemann | 361/36 |
| 3,654,516 | 4/1972 | Traversi | 361/78 |
| 4,204,237 | 5/1980 | Zocholl | 361/36 |

OTHER PUBLICATIONS

"A three-phase differential relay for transformer protection" by Einvall et al., INSPEC IEEE Transactions on Power Apparatus and Systems; vol. PAS-94, No. 6, Nov./Dec. 1975.

Primary Examiner—Patrick R. Salce
Attorney, Agent, or Firm—D. R. Lackey

[57] ABSTRACT

Differential protective relay methods and apparatus which include a differential current function supervised by both a harmonic restraint function and a voltage change function. The voltage change function determines whether or not the differential current function requires harmonic restraint supervision, preempting such supervision when it is not required, to enable faster trip decisions to be made by the differential current function.

8 Claims, 5 Drawing Figures

PROTECTIVE RELAY METHODS AND APPARATUS

BACKGROUND OF THE INVENTION

1. Field of the Invention

The invention relates in general to protective relaying methods and apparatus, and more specifically to differential relays for protecting electrical inductive apparatus.

2. Description of the Prior Art

Differential relays are the principal form of fault protection for transformers rated 10 MVA, and above. Summing the instantaneous currents in the transformer zone can provide a very quick trip decision when the transformer experiences a phase-to-ground fault, from the percentage current-differential measuring unit. For example, this unit can provide a trip decision in 3 to 5 ms. If there is no internal fault in the apparatus being protected, the differential current resulting from this summation should be zero. If there is an internal ground fault, the current flow into the apparatus will exceed the flow out, with the difference being called the differential current. The current-differential unit compares the differential current with a predetermined value, such as the largest of the currents being summed, or the sum of the absolute values of the currents being summed, and it makes a trip decision when the differential current exceeds a predetermined percentage of this comparison value.

When a transformer is energized, or when the voltage collapses due to a fault external to the transformer's protective zone and then returns following the clearance of the fault, a transient magnetizing or exciting current will flow. This current, also called the inrush current, reaches peaks which are many times full load current, and it appears to be an internal fault to the differentially connected relays. To prevent tripping of the transformer circuit breakers due to inrush current, differential relays for such applications include a harmonic restraint unit. The inrush current is severely distorted, and it has a large second harmonic component. The harmonic restraint unit detects inrush by comparing the fundamental or 60 Hz component with the second harmonic or 120 Hz component. The harmonic restraint unit prevents a trip signal from being sent to a circuit breaker when the second harmonic component exceeds a predetermined percentage of the fundamental. These components are separated by filtering, however, such as shown in U.S. Pat. No. 3,414,772, and the response time of the differential relay with harmonic restraint is increased to at least a full power cycle, such as 17-24 ms. This is true whether the filtering is performed with inductors and capacitors, which introduce certain time delays following the onset of differential current, or digitally with a filtering algorithm. In the latter instance, a full cycle of data is required to accurately extract the different components, and to make the ratio comparison.

SUMMARY OF THE INVENTION

Briefly, the present invention relates to new and improved methods and apparatus for differential relaying which adds a voltage supervisory function to the differential current and harmonic restraint functions. The invention recognizes that the only time the harmonic restraint function is required is during energization of the transformer, or during resumption of voltage after a fault which caused it to collapse has been cleared. The invention further recognizes that the voltage increases rapidly during these current inrush conditions. Thus, the voltage supervision of the present invention monitors the rate of change of the voltage in the transformer zone. When the rate of change of a voltage increase exceeds a predetermined magnitude, the voltage supervision function invokes harmonic restraint supervision. At all other times, when the voltage is steady, or has dropped, the harmonic restraint function is pre-empted by the voltage supervision, allowing the differential current unit to make a trip decision within about 3-5 ms after the fault-induced differential current is initiated. It is important that the voltage supervision unit operate faster than the differential unit. In a preferred embodiment, the voltage supervisory function is performed digitally, sampling the voltage many times per power cycle, such as 12 or 16 times. Thus, by comparing each sample with a stored sample obtained one cycle earlier, a rate of change of the voltage may be determined every 1.389 ms for a 12-sample system, or every 1.04 ms for a 16-sample system, which provides the required relative speeds.

BRIEF DESCRIPTION OF THE DRAWINGS

The invention may be better understood, and further advantages and uses thereof more readily apparent, when considered in view of the following detailed description of exemplary embodiments, taken with the accompanying drawings in which.

DESCRIPTION OF PREFERRED EMBODIMENTS

Figure 1:
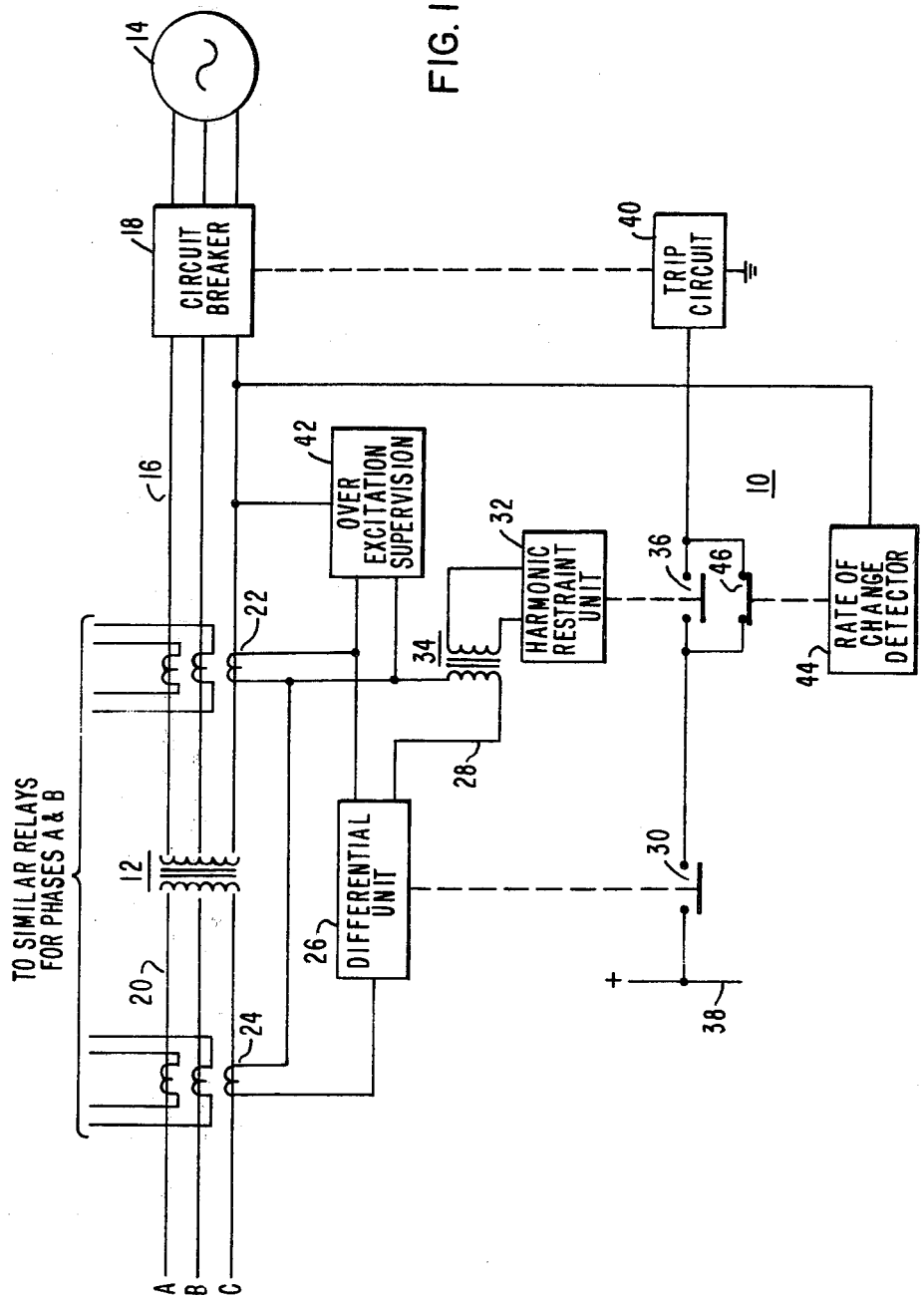
FIG. 1 is a schematic and block diagram illustrating a protective relay arrangement constructed according to the teachings of the invention.

The present invention relates to new and improved protective relaying methods and apparatus for the protection of electrical inductive apparatus, such as large power transformers and iron core reactors. The purpose of the new methods and apparatus is to reduce the response time of a differential relay for most faults in such apparatus. In a three-phase system, three differential relays sum the instantaneous currents entering the zone of the apparatus to be protected. The sums, theoretically, will be zero when there is no fault in the apparatus, and a differential current will be produced when a fault occurs. To reduce the damage to the apparatus, the apparatus should be de-energized as quickly as possible following detection of a predetermined percent of differential current, related to a predetermined current being summed, or the sum of the absolute values of the summed currents. The differential relationships hold true at each and every instant of time, and correspondingly for all frequency components of the current signals. This differential detection requires no filtering of wave forms, and thus the differential unit may be constructed to provide a trip signal within about 3 to 5 ms. However, the relay would also trip on inrush, as current inrush upon initial excitation, or re-excitation following voltage collapse and subsequent return when a fault is cleared, produces a differential current sufficient to cause the relay to provide a trip signal. To prevent tripping on inrush current, the differential unit of a differential relay is supervised by a harmonic restraint unit. Inrush current includes a large second harmonic component. If the harmonic restraint unit detects a predetermined ratio of the second harmonic component to the fundamental component in the differential current, it prevents the issuance of a trip signal. The harmonic supervision, however, cannot determine this ratio as quickly as the differential unit can make its percent differential current determination. Even solid-state and digital methods require at least a full cycle of data for accurate measurement. Thus, the differential relay with harmonic restraint requires about 17 to 24 ms to issue a trip signal in cooperation with the differential unit, following a fault in the apparatus being protected.

The new method, in addition to the summing step, and the step of determining the ratio of the second harmonic to the fundamental, includes the step of monitoring the rate of change of the voltage in the zone of the apparatus being protected. This monitoring step determines if a current inrush is involved. If the voltage is not increasing, or the rate of change of an increasing voltage is below a predetermined value, it is determined that current inrush is not involved and the new method includes the step of preempting harmonic supervision, to enable the fast differential unit to directly provide a trip signal for the associated circuit breaker. If the voltage has increased significantly at the time of differential unit operation, or shortly before, then the monitoring step activates the step of supervising the differential unit with the harmonic restraint function. Thus, the method includes the step of providing a trip signal for the circuit breaker in direct response to the current summing step when the voltage monitoring step does not detect a voltage rate of change, and direction of change, indicative of a current inrush. Further, the method includes the step of providing a trip signal for the associated circuit breaker in response to both the current summing step and the harmonic ratio determining step, when the voltage monitoring step detects a rate of increase which exceeds a predetermined rate.

FIG. 1 is a schematic diagram of new and improved protective relay apparatus 10 which embodies an implementation of the hereinbefore described method. Protective relay apparatus 10 is connected to protect electrical inductive apparatus 12, such as a transformer bank. The transformer bank may be connected in a single-phase system, or in a three-phase system. If in a three-phase system, it may include, for example, three single-phase transformers, or a single three-phase transformer. For purposes of example, FIG. 1 is illustrated as being a three-phase system. One side of apparatus 12 is connected to a source 14 of alternating three-phase electrical potential, having a power frequency of 50 or 60 Hz, via busses or transmission line 16 and a circuit breaker 18. The other side of apparatus is connected to a load circuit via a transmission line 20 having phases A, B and C. For a three-phase system, three differential relays would be utilized, each connected to receive "in" and "out" currents that are inphase for a balanced load condition. Since each relay for each phase would be similar to the other relays, it is sufficient to show and describe a differential relay for one of the phases, such as phase C.

U.S. Pat. No. 3,414,772 illustrates a differential relay having a differential unit and a harmonic restraint unit. In order to limit the complexity of the present application, this patent is hereby incorporated into the present application by reference. Details of the differential unit (DU) and the harmonic restraint unit (HRU) shown in this patent are illustrated in block form in the present application.

Differential protection for phase C includes current transformer 22 and 24 which sense the "in" and "out" currents, respectively. Current transformers (ct's) 22 and 24 are connected in series with one another through a differential unit 26. The differential unit 26 sums the current entering the transformer. Theoretically, the instantaneous sum should be zero if there is no ground fault in the apparatus 12, and thus the differential current would be zero. In practice, ct errors, and the like, cause some differential current to flow in conductor 28. The differential unit 26 is arranged to close a n.o. contact 30 when it detects that the differential current is a predetermined percentage of a predetermined value, such as the larger of the two summed currents, or the sum of the currents using absolute values. This predetermined percentage is selected such that it ignores the relatively small differential currents which may flow due to normal mismatch and ct errors. An example of a suitable percentage which will operate the differential unit is 15% when compared with the largest of the summed currents, but other percentages may be used.

In order to restrain or prevent tripping by the differential unit 26 during current inrush, a harmonic restraint unit 32 senses the differential current flowing in conductor 28, such as via a mutual reactor 34. The harmonic restraint unit 32 is frequency sensitive, with the fundamental component being connected to energize an operate winding, and the second harmonic component being connected to energize a restraint winding. If the differential current is substantially free of the second harmonic, contact 36 will be actuated to a closed position. If the second harmonic component of the differential current exceeds the predetermined percentage of the fundamental component, such as 15%, for example, it will not close contact 36. Contacts 30 and 36 are connected in series between a source of electrical potential, indicated by conductor 38, and the trip circuit 40 of circuit breaker 18. Thus, in the differential relay of U.S. Pat. No. 3,414,772, if the differential unit 26 detects a differential current of sufficient magnitude to indicate the possibility of a ground fault in apparatus 12, and the harmonic restraint unit 32 does not detect substantial second harmonic current in the differential currrent, both contacts 30 and 36 will close to provide a trip signal for the circuit breaker 18.

The incorporated patent also discloses overvoltage supervision, which is shown in block form at 42. A voltage increase above normal-rated voltage increases the magnetizing current, and this may cause false operation of the differential relay. The overexcitation supervision 42 detects overvoltage, above a fixed threshold, and adds a restraining quantity to the harmonic restraint unit 32. This overvoltage supervision may be added to the differential relay of the invention, if desired, but it is not essential.

The differential unit 26 makes its determination by summing the instantaneous current flow, and can thus operate faster than the harmonic restraining unit 32, which involves filtering of the differential current wave form. The present invention monitors the voltage in the zone of the apparatus 12 via a rate-of-change detector 44. The rate-of-change detector 44 makes a decision, based upon the rate of change of the voltage, as to whether or not harmonic restraint supervision of the differential unit 26 is required. If the voltage has increased significantly at the time of the differential unit operation, or shortly before, a current inrush condition may be present and the rate-of-change detector 44 opens a n.c. contact 46 which is connected across contact 36 of the harmonic restraint unit. Thus, the harmonic restraint supervision is invoked. The rate-of-change detector 44 includes a timer to maintain contact 46 open for a suitable length of time, once a predetermined change has been detected. A suitable length of time would be the time required for substantial inrush content to disappear after energization, and it depends upon the magnetic characteristics and design parameters of the transformer being protected. If the voltage has held relatively steady, or decreased, contact 46 remains closed to preeempt harmonic supervision and enable the differential unit 26 to directly trip circuit breaker 18. It is important to note that the rate-of-change detector 44 must be designed to operate more quickly than the differential unit 26. A suitable change detector may simply rectify a voltage which is proportional to the alternating voltage being monitored, with the rectified voltage being applied to an RC circuit having a bleeder resistor connected across the capacitor. Another suitable change detector is disclosed in U.S. Pat. No. 3,654,516, entitled "Change of Current or Voltage Actuated Protecting Relay" by M. Traversi. A digital embodiment of a suitable rate-of-change detector which can make a determination of the rate of change in about 1 to 1.4 ms will be hereinafter described. Since the fastest differential unit typically operates in about 3 to 5 ms, the digital embodiment will be fast enough for any practical, secure implementation of the differential unit.

The only change in voltage that is necessary to detect is that of an increasing voltage. However, if the rate-of-change detector 44 detects both increasing and decreasing voltages, it would not significantly alter the advantages of the invention. It would simply invoke harmonic restraint occasionally when it is not essential. The speed of the differential relay 10 shown in FIG. 1 has thus been substantially increased at all times, except those very short periods of time when the apparatus is initially energized, and when voltage is reapplied to the apparatus following the clearance of a fault. During these very short periods of time, harmonic restraint supervision is invoked, in order to prevent unnecessary tripping due to false differential current caused by the inrush current.

Figure 2:
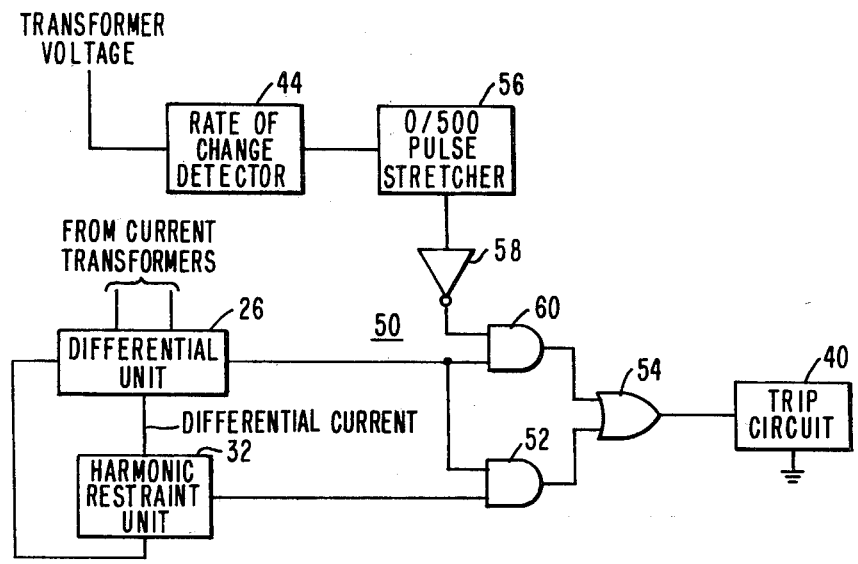
FIG. 2 illustrates a solid-state logic implementation of the protective arrangement shown in FIG. 1.

FIG. 2 illustrates a differential relay 50, which is similar to relay 10 shown in FIG. 1 except its logic is constructed of logic gates, instead of electromechanical relays. Like reference numerals in FIGS. 1 and 2 refer to like components.

More specifically, in this embodiment of the invention, the differential unit 26 would change its output from a logic zero to a logic one when a predetermined differential current percentage is detected. The harmonic restraint unit 32 would output a logic zero when the differential current is below a predetermined magnitude. When the differential current exceeds a predetermined threshold magnitude, its output will remain a logic zero if the harmonic content reaches a predetermined magnitude, and it will go to a logic one if the harmonic content is below the predetermined magnitude. The outputs of the differential unit 26 and harmonic restraint unit 32 are connected to the inputs of a dual input AND gate 52, and the output of AND gate 52 is connected to an input of an OR gate 54. The output of OR gate 54 is connected to the trip circuit 40 of circuit breaker 18, which trips the circuit breaker 18 when a logic one is applied to its input. Thus, if the differential unit 26 detects a predetermined differential current and outputs a logic one, the actual tripping of the circuit breaker 54 will be delayed until the harmonic restraint unit 32 determines that the second harmonic in the differential current is below the preselected magnitude.

The present invention teaches the addition of the rate-of-change detector 44 which monitors the voltage of the apparatus being protected, as disclosed in the FIG. 1 embodiment. The invention also discloses adding a 0/500 pulse stretcher 56, an inverter gate 58, and an additional AND gate 60. The output of the rate-of-change detector 44 goes to a logic one when a predetermined rate of change of the voltage is exceeded, the pulse stretcher holds this logic one for 500 ms beyond its termination, and this logic one signal is applied to one input of AND gate 60 via inverter gate 58. The output of the differential unit 26 is applied to the other input of AND gate 60. The output of AND gate 60 is connected to the remaining input of OR gate 54. Thus, when a predetermined rate of change of voltage is detected, AND gate 60 is blocked and any tripping of the circuit breaker must be made through AND gate 52, which includes harmonic restraint. If the voltage has been steady, or has not exceeded a predetermined rate of change, AND gate 60 is enabled and the differential unit is allowed to provide a faster trip through AND gate 60.

Figure 3:
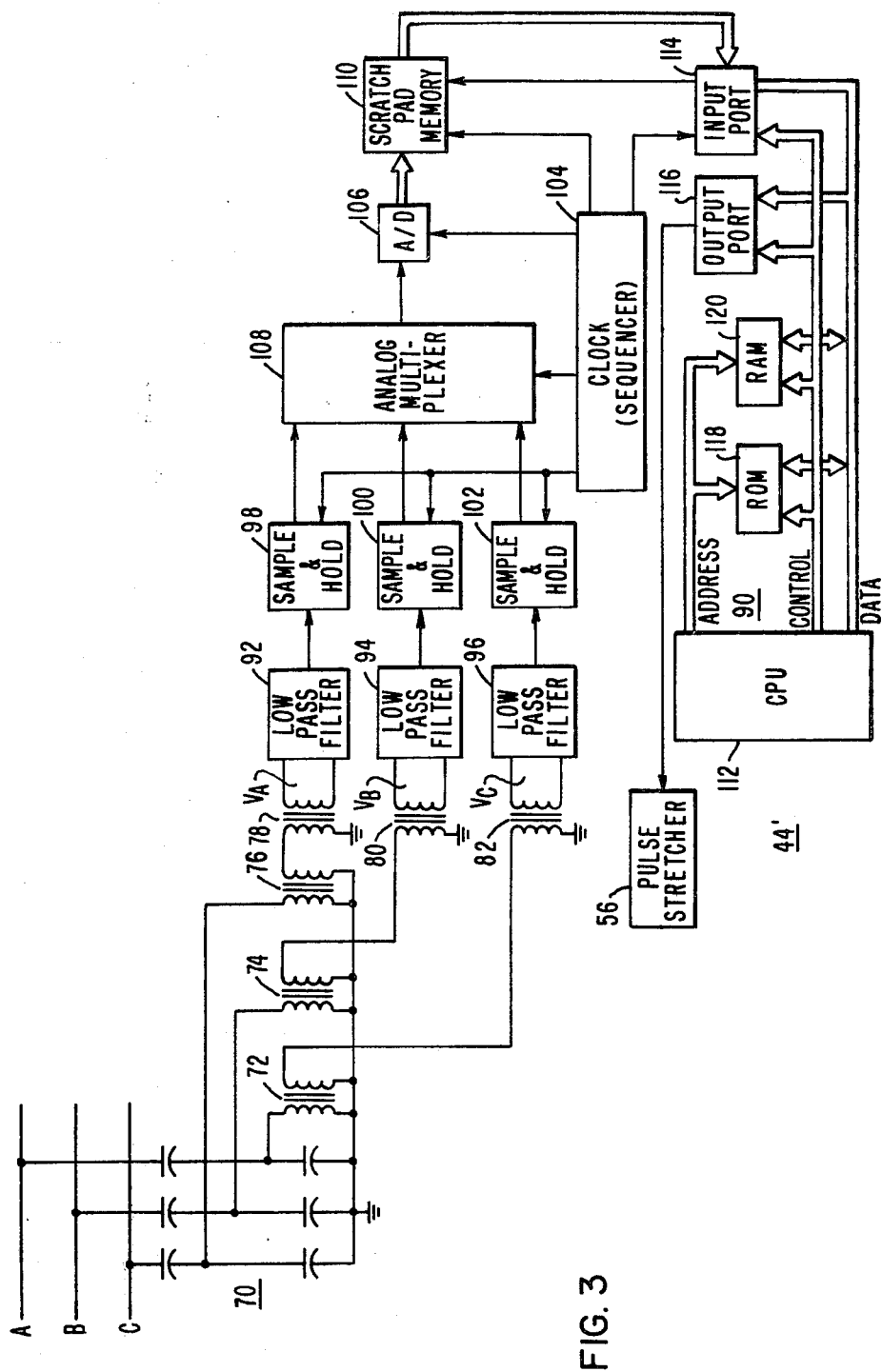
FIG. 3 sets forth a digital computer implementation of the voltage change detector shown in block form in FIGS. 1 and 2.

FIG. 3 is a schematic diagram which illustrates a rate-of-change detector 44' which may be used for the rate-of-change detector 44 shown in FIGS. 1 and 2. Information relative to the voltage in the zone of apparatus 12 to be protected may be provided from bushing taps or, as illustrated, by a capacitive type voltage divider 70. Potential transformers 72, 74 and 76 connected to the voltage divider 70, and isolating potential transformers 78, 80 and 82 connected to the outputs of potential transformers 78 and 82, respectively, provide analog signals $V_A$, $V_B$ and $V_C$ proportional to the three-phase voltages applied to transformer 12.

The rate-of-change detector 44' includes a digital computer 90, such as a microprocessor. The current differential and harmonic restraint functions, as well as the logic of the invention, may also be conveniently implemented by the same digital computer. Since the invention does not require digital implementation of these functions, they are not shown in the digital implementation of the rate-of-change function.

More specifically, in order to provide information in the proper form for use by the digital computer 90, the analog voltage signals $V_A$, $V_B$ and $V_C$ may be converted to digital form by any suitable process. For example, after the voltage signals $V_A$, $V_B$ and $V_C$ are passed through low-pass, anti-aliasing filters 92, 94 and 96, respectively, they are applied to sample and hold circuits 98, 100 and 102, respectively. The filter outputs are sampled and held at a predetermined rate, such as the hereinbefore-mentioned 12 or 16 times per power frequency cycle. For purposes of example, twelve samples per cycle will be assumed, with the voltage wave forms being sampled every 30° to provide twelve uniformly spaced sampling points which will be referred to as samples $f_0$ through $f_{11}$.

A clock 104, also called a sequencer, provides the signals for operating the sample and hold circuits 98, 100 and 102, as well as the necessary signals for further processing of the sampled and held signals. The sample and hold functions simultaneously sample and hold the voltage wave forms for all three phases. Since the analog-to-digital converters are relatively costly, the analog voltage samples may be multiplexed through a single A/D converter 106 via an analog multiplexer 108. The output of the A/D converter stores each of the voltage samples in digital form in a scratch pad memory 110. Thus, the sequencer 104, after providing signals for the sample and hold functions, provides a signal for the analog multiplexer which connects the output of one of the sample and hold functions to the input of the A/D converter 106. The sequencer then provides a signal for the A/D converter to perform the conversion, and a signal from the sequencer 104 then stores the digitized value at the next empty location in memory 110. The multiplexing, the A/D converting, and storing signals are repeated until all sampled and held values are stored in memory 110.

Computer 90 includes a central processing unit or CPU 112, an input port 114, an output port 116, a read-only memory or ROM 118, and a random access memory or RAM 120.

After all of the sampled and held values of the present sampling period are stored in memory 110, the sequencer 104 provides an interrupt signal for the input port 114 of computer 90. The input port 114 reads the first memory word and stores it in RAM 120, and it then provides a signal for memory 110 to place the next binary word on its output bus, etc., until all of the memory words have been transferred into RAM 120. Sequencer 104 repeats the process every 1.389 ms to provide the twelve samples per 60 Hz power cycle selected for purposes of example. Instead of using interrupts as the mode for transferring the data, other techniques, such as polling, or direct-memory access (DMA), may be used.

Figure 4:
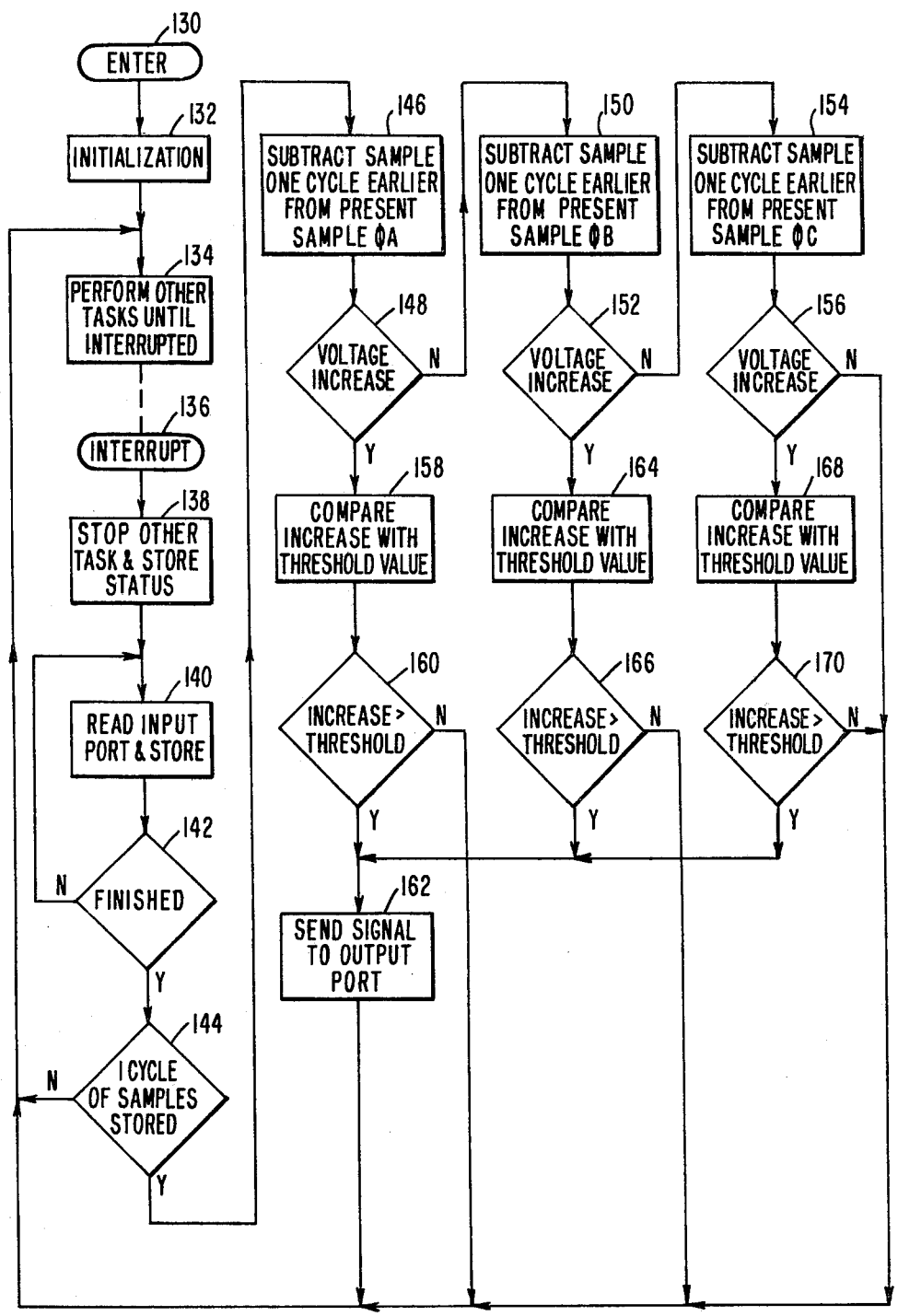
FIG. 4 is a flow chart which illustrates a program which may be used by the digital computer shown in FIG. 3 to implement the voltage change function.

FIG. 4 is a detailed flow chart which may be used to write a program for the digital computer 90 to implement the rate-of-change function. This program is entered at 130 and step 132 initializes the system, such as by clearing certain memories, etc. The program may then serve other tasks, as indicated by step 134. When samples are ready for transfer, an interrupt 136 is provided by sequencer 104 and the computer 90 goes into an interrupt service program, indicated by step 138. This program stops the other task and stores its status for later return. Step 140 then reads the input port 114 and stores the word in RAM 120. Step 142 checks to see if all of the memory words stored in memory 110 have been transferred. If not, the program loops through steps 142 and 140 until the memory has been emptied.

Figure 5:
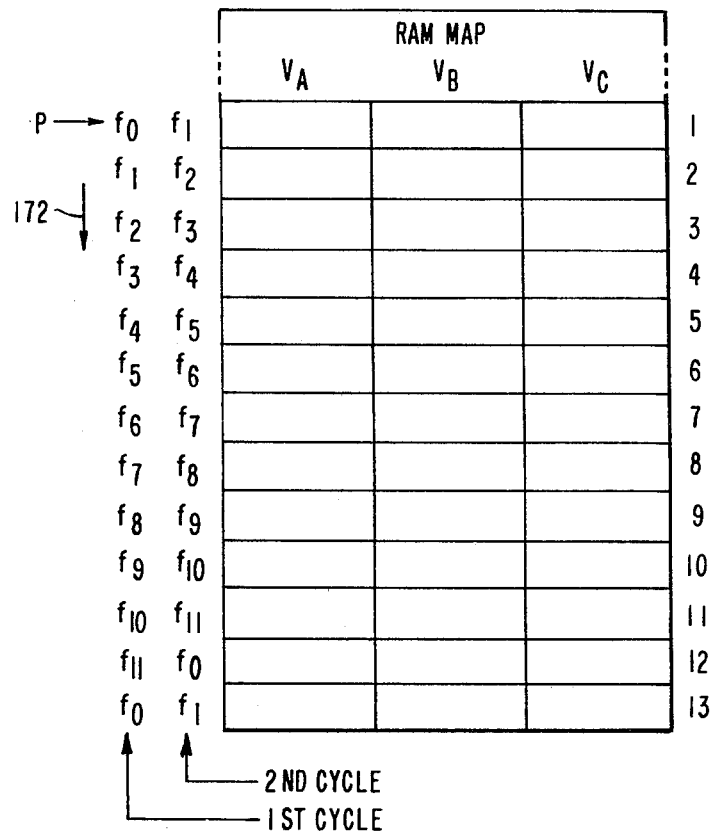
FIG. 5 is a RAM map which illustrates a suitable format for storing the voltage samples for each phase of the polyphase alternating current power system, in the zone of the protected apparatus.

FIG. 5 is a RAM map which illustrates a suitable format for storing the binary voltage samples of each phase.

In order to detect a voltage increase, each voltage sample is compared with the sample obtained exactly one cycle earlier. Thus, step 144 checks to see if one cycle of samples has been stored before continuing with the voltage change detection program. Once a full cycle of samples has been stored in RAM 120, the program advances from step 144 to step 146. Step 146 subtracts the latest voltage sample from the voltage sample obtained one cycle earlier for phase A. A convenient arrangement for making this comparison is shown in the RAM map of FIG. 5. The twelve samples per cycle for each phase are stored at thirteen consecutive addresses, starting at pointer P, which pointer is indexed in the direction of arrow 172 to store each new sample. When the twelve samples of the first cycle are stored, sample $f_0$ of the next cycle is stored at the thirteenth address, and the next storage address is the storage 1 location, referenced along the right hand side of the RAM map. After one full cycle has been stored, when each subsequent sample is stored at the address of the indexed pointer P, the sample taken exactly one cycle earlier will always be at address P+1. When sample $f_0$ is stored at location 13 at the start of the second cycle, address P+1 is defined as storage location 1, where sample $f_0$ from the first cycle is stored. Thus, sample $f_0$ at address P (location 13) is compared with sample $f_0$ at address P+1 (location 1). Pointer P is then moved to location 1. When sample $f_1$ is received, it is written over the previous sample $f_0$, into location 1, and the very next address contains sample $f_1$ from the previous cycle, which it is compared with.

After step 146 subtracts the earlier sample at address P+1 from the latest sample at the present address of the pointer P, step 148 checks to see if the result is positive. If it is, the voltage has increased since the last cycle. If not, the voltage may be the same, or less. If the phase A voltage has not increased, steps 150 and 152 check the phase B voltage for an increase, and if it has not increased, steps 154 and 156 check the phase C voltage for an increase. If none of the phase voltages has increased since the last cycle, the program returns to step 134.

If step 148 finds the voltage has increased since the last cycle, step 158 compares the increase with a predetermined threshold value selected to test the increase for a predetermined rate of change. Since the sample it is being compared with was taken 16.67 ms ago, for a 60 Hz power frequency, this timing period would be used to calculate the comparison value for the rate of change to be detected. For example, the threshold may be set to detect a 20% increase in magnitude over the value at precisely the same point of the earlier cycle. If the detected increase exceeds the selected threshold value, step 162 sends a logic one signal to the output port 116.

This output signal may be maintained for a predetermined period of time by setting a software timer within the program, or it may be applied to an external pulse stretcher, such as the pulse stretcher 56 shown in FIG. 2. The stretched logic one signal may operate a relay having a contact 46, as shown in FIG. 1, or it may be applied to inverter gate 58, as shown in FIG. 2. If the differential and harmonic functions are determined by the computer 90 from voltage and current samples, then instead of sending a signal to the output port, the detection of the predetermined rate of change would be used in the software logic to cause harmonic restraint to be invoked.

In summary, there have been disclosed new and improved methods and apparatus related to a differential relay for protecting electrical inductive apparatus, with the voltage supervision disclosed by the invention substantially increasing the operating speed of the relay for most faults. The operating speed would only be as slow as conventional methods for those faults in the protected apparatus which occur when the voltage is increasing faster than a predetermined rate.

I claim as my invention:

1. In a protective arrangement for electrical inductive apparatus connected to a source of alternating potential via a circuit breaker, wherein the apparatus is protected by a differential current arrangement which normally can provide a trip signal for the circuit breaker only when supervised by harmonic restraint, the improvement comprising:

first means for monitoring the rate of change of the source of potential in the zone of the apparatus to be protected, and for determining whether or not harmonic restraint is required in response thereto, and second means responsive to said first means for enabling the differential current arrangement to provide a trip signal for the circuit breaker without harmonic restraint supervision when such supervision is not required.

2. The protective arrangement of claim 1 wherein the harmonic restraint supervision slows the response of the protective arrangement by a predetermined period of time, and wherein the first and second means operate in substantially less time than said predetermined period of time, to reduce the response time of the protective arrangement when the first and second means enable protection of the apparatus without harmonic restraint.

3. The protective arrangement of claim 1 wherein the first and second means are arranged to make the determination relative to harmonic restraint, and to enable the differential current unit to protect the apparatus without harmonic restraint supervision, faster than the differential current arrangement makes a decision relative to the differential current.

4. In a protective arrangement for electrical inductive apparatus connected to a source of alternating potential, wherein the apparatus is protected by a differential current arrangement normally supervised by harmonic restraint, the improvement comprising:

first means for determining whether or not harmonic restraint is required, said first means monitoring the magnitude of the source of potential in the zone of the apparatus to be protected, providing a first signal in response to an increase therein which exceeds a predetermined rate of change, and otherwise providing a second signal, and second means responsive to said first means, with the second means enabling the differential current arrangement to protect the apparatus without harmonic restraint while the first means is providing said second signal.

5. The protective arrangement of claim 4 wherein the second means includes means for causing said harmonic restraint supervision to be effective during the presence of the first signal, and for a predetermined period of time thereafter.

6. In a protective arrangement for electrical inductive apparatus connected to a source of alternating potential, wherein the apparatus is protected by a differential current arrangement normally supervised by harmonic restraint, the improvement comprising:

first means for determining whether or not harmonic restraint is required, said first means including means for sampling the source of potential at a predetermined rate, and means for comparing each sample with a sample taken one power cycle earlier, for providing a signal indicating harmonic restraint supervision is required when the present sample exceeds the prior sample by a predetermined magnitude, and second means responsive to said first means for enabling the differential current arrangement to protect the apparatus without harmonic restraint supervision when such supervision is not required.

7. The protective arrangement of claim 6 including means for causing the signal which indicates harmonic restraint supervision is required to persist for a predetermined period of time.

8. A method of protecting electrical inductive apparatus connected to a source of alternating electrical potential via a circuit breaker, comprising the steps of:

summing the currents in the zone of the apparatus to be protected to develop a differential current in response to a ground fault in the apparatus, monitoring the rate of change of the voltage in the zone of the apparatus to be protected, determining the ratio of the second harmonic component to the fundamental component in the differential current, providing a trip signal for the circuit breaker in direct response to the summing step when the monitoring step indicates the rate of change of the voltage has not exceeded a predetermined value, and in response to both the summing and the determining steps when the monitoring step detects a voltage increase which exceeds a predetermined rate of change.

* * * * *